United States Patent [19]

Tagliavini

[11] 4,158,917

[45] Jun. 26, 1979

[54] APPARATUS FOR CHECKING THE DIMENSIONS OF MECHANICAL WORKPIECES IN MOVEMENT

[75] Inventor: Antonio Tagliavini, Bologna, Italy

[73] Assignee: Finike Italiana Marposs, S.p.A., Bentivoglio, Italy

[21] Appl. No.: 871,830

[22] Filed: Jan. 24, 1978

[30] Foreign Application Priority Data

Jan. 27, 1977 [IT] Italy .................................. 3322 A/77

[51] Int. Cl.$^2$ ............................................. G01B 7/04
[52] U.S. Cl. .................................. 33/147 L; 33/174 L
[58] Field of Search ............. 33/147 L, 143 L, 147 N, 33/174 L, 172 E, 178 E, 148 H

[56] References Cited

U.S. PATENT DOCUMENTS

| 3,345,753 | 10/1967 | Giardino | 33/172 |
| 3,579,843 | 5/1971 | Peonski | 33/147 |
| 3,996,669 | 12/1976 | Anichini | 33/172 E |

FOREIGN PATENT DOCUMENTS 1233234  5/1971  United Kingdom .................. 33/148 H

OTHER PUBLICATIONS

Electronic Design 19, Sep. 13, 1976, Article—"Use Slew-Rate Filtering", by M. J. Wright, pp. 110–112, Hayden Publishing Co., Inc., Rochelle Park, N. J.

Primary Examiner—Richard E. Aegerter
Assistant Examiner—Willis Little
Attorney, Agent, or Firm—Stevens, Davis, Miller & Mosher

[57] ABSTRACT

An apparatus for checking the dimensions of mechanical workpieces in movement with respect to the apparatus, including at least one feeler adapted to cooperate with the surface of the workpiece, or workpieces, at least one transducer connected to the feeler for providing a signal responsive to the dimensions, processing apparatus connected to the transducer for processing the signal and providing a measurement signal, the processing apparatus including a limiter circuit adapted to receive the signal responsive to the dimensions and limit it as to variations in a pre-established direction, providing a relative output signal, output apparatus connected to the processing means to receive and utilize the measurement signal and control apparatus. The processing apparatus include a further limiter circuit, adapted to receive the output signal of the first limiter circuit and carry out limitations regarding even variations in the opposite direction to the pre-established one, the resultant signal being utilized to obtain the measurement signal. The control apparatus enables and inhibits the further limiter circuit.

8 Claims, 5 Drawing Figures

APPARATUS FOR CHECKING THE DIMENSIONS OF MECHANICAL WORKPIECES IN MOVEMENT

The present invention relates to an apparatus for checking the dimensions of mechanical workpieces in movement with respect to the apparatus, including feeler means adapted to cooperate with the surface of the workpiece, or workpieces, transducer means connected to the feeler means for providing a signal responsive to the dimensions, processing means connected to the transducer means for processing the signal and providing a measurement signal, the processing means including a limiter circuit adapted to receive the signal responsive to the dimensions and limit is as to variations in a pre-established direction, providing a relevant output signal, and output means connected to the processing means to receive and utilize the measurement signal. More particularly the invention relates to the comparative measurement of the dimensions of mechanical workpieces with interrupted surfaces, for example grooved workpieces, while being machined by tooling machines, such as grinding machines. Various types of comparator gauges usable for the described application are already known. Generally these gauges include one or two adjustable arms carrying feelers, elastic means urging the feelers towards the workpiece, or workpieces, transducers adapted to provide signals responsive to the position of the feelers and electric processing and indication circuits.

Hydraulic dampers are also used to dampen the fall of the feelers in the workpiece interruptions, or in the spaces separating one workpiece from the following (e.g., when machining on surface grinding machines) but keep them in contact with the surfaces to be gauged.

The electric circuits include circuits for decreasing the variation speed of the measurement signals in one or in both directions, max. or min., or averaging circuits.

Generally the indication of known gauges depends in a considerable way on the operating conditions, in particular the indication varies as static operation is changed to dynamic operation (workpiece in movement).

Therefore it is necessary to set to zero the gauges in dynamic conditions and maintain constant the operating conditions as far as possible.

An object of the invention is to provide a gauge whose operation basically does not alter when switching from static to dynamic workpiece measurement taking, and that will not be affected by changes in workpiece speed nor by other variations of the working parameters and working conditions.

A further object of the invention is to provide a gauge that will work at a high level of accuracy and repeatability even in particularly unfavorable measuring conditions, due to, for example, the irregular shape of workpieces, severe working parameters, or the possible need to use gauges with mechanical characteristics unsuitable for the measurement of workpieces with interrupted surface.

These and other objects and advantages are obtained through an apparatus of the type stated at the beginning of the description wherein, according to the invention, the processing means include a further limiter circuit, adapted to receive the output signal of the first limiter circuit and carry out limitations regarding even variations in the opposite direction to the pre-established direction, the resultant signal being utilized to obtain the measurement signal, the apparatus also including control means to enable and inhibit the further limiter circuit.

The invention is now described with reference to the accompanying drawings given by way of non-limiting example, wherein same parts or equivalent ones are marked with the same reference numbers and in which.

Figure 1:
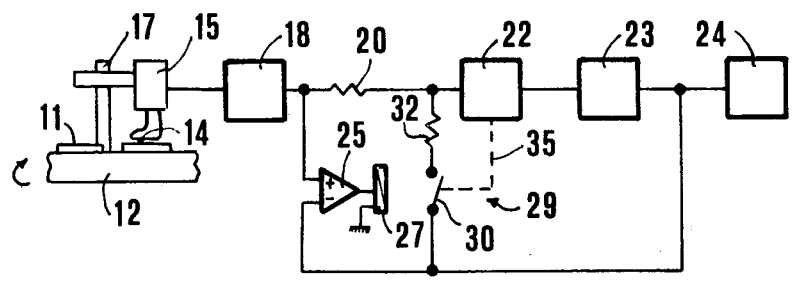
FIG. 1 is a block diagram according to a first embodiment of the invention, referred to a single feeler gauge mounted on a surface grinding machine with a rotary table.

With reference to FIG. 1, the workpieces 11 arranged on rotary table 12 of a surface grinding machine are successively contacted by feeler 14 of a measuring head 15 supported by a support 17 mounted on the grinding machine. Head 15 houses a position transducer, not shown, the output signal of which is responsive to the position of a movable element of the transducer. The movable element is carried by an arm (not shown) carrying feeler 14. The transducer output signal reaches an amplifier-detector 18 whose output is connected, by means of a resistor 20 of $R_1$ value, to a limited decrease-rate circuit 22, downstream of which there are a low pass filter circuit 23 and a processing and indication unit 24.

A comparator circuit 25 receives at the positive input the output signal of the amplifier-detector 18 and at the negative input the output signal of the low-pass filter 23.

Figure 2:
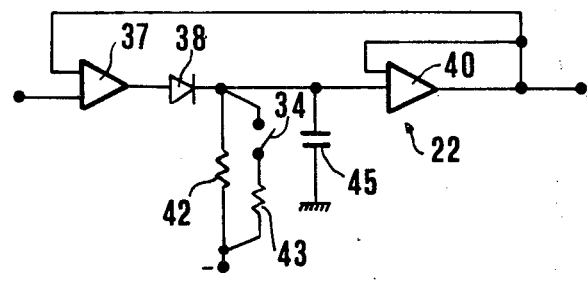
FIG. 2 is a more detailed circuit diagram of a circuit of the gauge of FIG. 1.

A relay 29 includes a coil 27, the energizing of which is controlled by the output of comparator 25, a contact 30 arranged in a connection between the output of filter 23 and through a resistor 32, of $R_2$ value, the input of the limited decrease-rate circuit 22, and another contact, indicated in FIG. 2 by reference number 34, displaced together with contact 30 by means of the functional connection 35 and adapted to control the limited decrease-rate circuit 22.

Naturally, relay 29 can be advantageously replaced by electronic switches.

With reference to FIG. 2, the limited decrease-rate circuit 22 includes an amplifier 37 with an input connected to resistor 20 and a diode 38 that has the anode connected to the output of amplifier 37 and the cathode connected to an input of another amplifier 40.

Connected to the cathode of diode 38 are also a resistor 42 which has a terminal biased by a source of negative voltage, a capacitor 45 having a terminal grounded and a contact 34 in series with another resistor 43 which has a terminal biased by the source of negative voltage.

The output of amplifier 40 is connected to the second input of the same amplifier and with the second input of amplifier 37. Upon examining the figure, it is evident that capacitor 45's voltage follows the positive variations of the input signal of circuit 22 whereas the decreasing voltage speed is limited by the time constant due to resistor 42 or to that due to resistors 42, 43 when they are connected in parallel.

Figure 3:
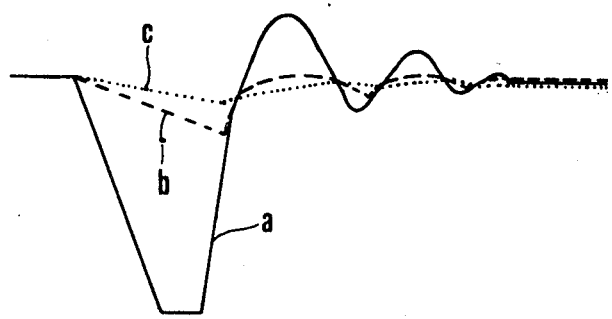
FIG. 3 shows possible signal wave forms to illustrate the operation of the gauge of FIGS. 1 and 2.

Now follows an explanation of the apparatus shown in FIGS. 1, 2, with reference to FIG. 3 wherein the wave form indicated by letter "a" shows a possible time diagram of the output signal of amplifier-detector 18, the wave form marked by letter "b" shows the corresponding output signal of limited decrease-rate circuit 22 and the wave form marked by letter "c" indicates the output signal of filter 23.

The curve "a" directly represents the movement of the movable element of transducer of head 15, in particular the movement due to the fast fall of the feeler 14 in the gap between a workpiece 11 and the following one, until reaching the stroke limit stop, the movement due to the subsequent contact of the feeler with the following workpiece, with increasing of the signal and positive and negative overshoots with respect to the amount relative to the upper surface of the workpiece, due to the sudden impact which causes feeler 14 to bounce and the arm supporting the latter to bend.

By examining curve "b" it is possible to realize that in the phase when feeler 14 is falling into a gap, the limited decrease-rate circuit 22 reduces the signal variation speed to a value determined by the circuit itself. Basically this value is determined by the time constant of discharge, through resistor 42, of capacitor 45 in FIG. 2 and it is pre-chosen by considering the theoretical removal rate of stock from workpieces 11.

When feeler 14 touches the following workpiece 11, the output signal of amplifier-detector 18 increases until it exceeds the output signal of filter 23 (curve "c").

Comparator 25, which receives the difference between the two signals, switches over when said difference takes a positive value, causing relay 29 to energize. Contact 30 closes and activates a feedback loop between the output of filter 23 and the input of limited decrease-rate circuit 22.

The closure of this feedback loop prevents the overshoots of the detector amplifier 18 signal—said overshoots ensuing from the sudden contact of feeler 14 with the workpiece surface and from the relevant transient—from being directly applied to the input of the limited decrease-rate circuit 22, and through the latter, to filter 23. In fact, as it may be seen by curve b, these overhsoots are attenuated according to the ratio $$R_2/(R_1+R_2).$$

This ratio is chosen so as to conveniently attenuate the overshoots, but at the same time allow filter 23 to update its output to the level of the signal corresponding to the workpiece 11 dimensions.

Measurement updating is facilitated by the fact that, while relay 29 is energized, contact 34 is closed and it keeps resistor 43 in parallel to resistor 42 so considerably reducing the discharge time constant of capacitor 45.

When relay 29 deenergizes, contacts 30, 34 open and the decrease speed of curve b is again limited by the limited decrease-rate circuit 22.

In this way it is possible to obtain a signal (curve c) at the output of filter 23 which represents with considerable accuracy the height dimension of workpieces 11, a dimension which decreases during machining due to the removal of stock.

Figure 4:
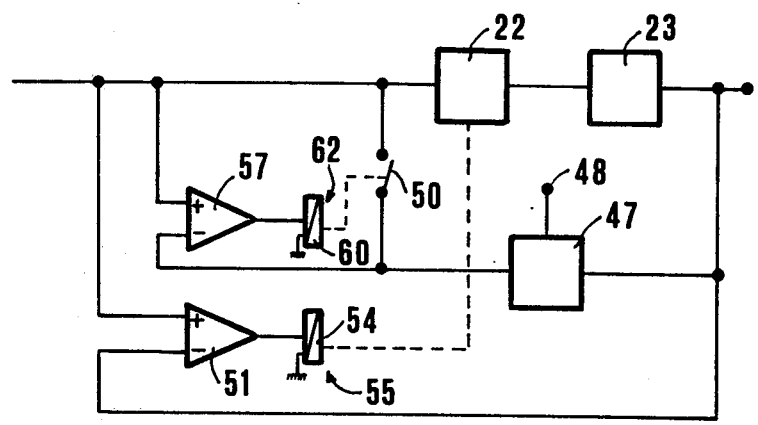
FIG. 4 is a block diagram illustrating a variant of the electric circuits of the gauge of FIG. 1, according to a preferred embodiment of the invention.

In the apparatus shown in FIG. 4, the output of low pass filter 23 is connected to an input of a summing circuit 47 which receives at another input 48 a predetermined reference signal.

The output of the summing circuit 47 can be connected, by means of a contact 50, to the input of the limited decrease-rate circuit 22.

The output of the low pass filter 23 is also connected to the negative input of a comparator 51 which receives at the positive input the amplifier-detector 18 signal. The output of the comparator 51 is connected to winding 54 of a relay 55 which operates contact 34 (FIG. 2) of the limited decrease-rate circuit 22.

Another comparator 57 has a positive input connected to the amplifier-detector 18 and a negative input connected to the output of the summing circuit 47. The output of comparator 57 is connected to the winding 60 of a relay 62 which operates contact 50.

Figure 5:
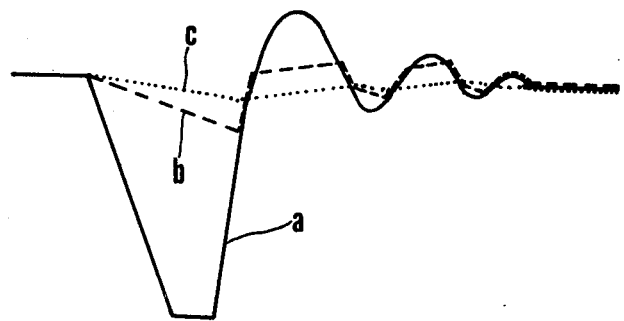
FIG. 5 illustrates possible signal wave forms of the gauge of FIG. 4.

The operation of the apparatus of FIG. 4 is easily understood with the aid of FIG. 5, wherein the curves, a, b, c, have an analogue meaning to that described for FIG. 3.

In correspondence with the overshoots of curve "a" with respect to the sum of the ordinates of curve "c" and of the reference signal previously mentioned, the contact 50 is closed and the level of the output signal of the limited decrease-rate circuit 22 is limited, because at the input of the same circuit arrives the sum of the output signal of filter 23 and of the fixed increment corresponding to the reference signal set in summing circuit 47.

Moreover, when the value of the output signal of filter 23 is greater than the value of output signal of amplifier-detector 18, the limited decrease-rate circuit 22 is inhibited by the closure of contact 34, facilitating the updating of the same circuit 22 output signal with respect to the amplifier-detector 18 output signal.

The apparatus shown in FIG. 4 can be simplified by eliminating the comparator 51 and relay 55 and by controlling contact 34, as well as contact 50, by relay 62.

It is also possible to eliminate comparator 57 and make relay 55 control contact 50, and also contact 34.

In consideration of the mechanical characteristics of the gauges (in particular the acceleration during the free fall of the feelers), it is possible to choose for the apparatuses shown in FIGS. 1 and 4, the values of slope and level limitations of the signals in order to cover an extremely broad range of applications, without necessitating any adjustments. It is evident that the invention can be applied to gauges including one or two feelers, with or without hydraulic dampers operating on the movable arms.

It is also obvious that if the polarities of the signals are opposite with respect to those described, for circuitry design, or owing to particular applications, instead of a limited decrease-rate circuit, a limited increase-rate circuit is used and the level limitation is made in a corresponding way.

Moreover, instead of a level limitation, it is possible to carry out a speed limitation for variations in the opposite direction to the one in which the first limiter circuit 22 intervenes. In this circumstance it is possible to utilize a single slope limiting circuit, having disconnectable components.

Obviously, the aforedescribed embodiments can undergo other variants and changes equivalent from a functional and structural point of view without falling outside the scope of the present invention.

What is claimed is:

1. An apparatus for checking the dimensions of mechanical workpieces in movement with respect to the apparatus, including:

feeler means adapted to cooperate with the surface of the workpiece or workpieces;

transducer means coupled to the feeler means for providing a signal responsive to said dimensions;

processing means connected to the transducer means for processing the signal responsive to dimensions and providing a measurement signal; and output means for receiving and utilizing said measurement signal, wherein the processing means include:

a first limiter circuit adapted to limit the signal responsive to dimensions as to variations in a pre-established direction;

a second limiter circuit adapted to limit the signal responsive to dimensions as to variations in the opposite direction to said pre-established direction, the first and the second limiter circuit providing a limited signal;

a filter circuit receiving the limited signal and providing the measurement signal; and control means including comparator means connected to the transducer means and to the filter circuit for providing control signals depending on the value of the signal responsive to dimensions with respect to the value of the measurement signal, and switch means operated by the control signals for selectively enabling and inhibiting the first and second limiter circuit.

2. The apparatus according to claim 1, for the measurement of workpieces with interrupted surface, wherein said feeler means include at least a feeler adapter to contact said surface, the comparator means including a comparator comparing the signal responsive to dimensions and the measurement signal, the comparator providing an output signal of ON-OFF type, one of the values of the comparator output signal being adapted to control the switch means for enabling the first limiter circuit—thereby to limit the signal responsive to dimensions as to its variation speed when said feeler no longer contacts the surface to be checked due to interruptions on the workpiece surface—and for inhibiting the second limiter circuit, the other value of the comparator output signal being adapted to control the switch means for inhibiting the first limiter circuit and for enabling the second limiter circuit, thereby to limit the signal responsive to dimensions during the transient following the resumption of contact between the feeler and the workpiece surface, after the interruption has passed.

3. The apparatus according to claim 2, wherein the second limiter circuit includes an attenuation circuit adapted to receive said signal responsive to dimensions and said measurement signal for attenuating according to a pre-set coefficient the difference signal of the received signals.

4. The apparatus according to claim 2, wherein the second limiter circuit includes a feedback network adapted to connect the output of the transducer means and the output of the filter circuit, said feedback network including a setting circuit for setting a reference signal for limiting the difference signal of the signal responsive to dimensions and of the measurement signal according to said reference signal.

5. An apparatus for checking the dimensions of mechanical workpieces in movement with respect to the apparatus including feeler means adapted to cooperate with the surface of the workpiece, or workpieces; transducer means connected to the feeler means for providing a signal responsive to said dimensions, process means connected to said transducer means for processing said signal and providing a measurement signal, and output means connected to the processing means to receive and utilize said measurement signal, wherein the processing means include a first limiter circuit adapted to receive the signal responsive to the dimensions and limit it as to variations in a pre-established direction; a low pass filter connected to the first limiter circuit for providing at its output said measurement signal; a second limiter circuit including a feedback network adapted to be connected between the output of the low pass filter and the input of the first limiter circuit, for providing to the input of the first limiter circuit the difference between the measurement signal and the signal responsive to the dimensions, attenuated according to a constant co-efficient; and control means including a comparator and switch means, the comparator having a first input connected to said transducer means and a second input connected to the output of said filter, the switching means including a first switch adapted to connect said feedback network and a second switch adapted to inhibit the first limiter circuit, the comparator being adapted to supply a switching control signal to said switching means when the difference between the comparator input signals takes a determined polarity.

6. An apparatus for checking the dimensions of mechanical workpieces in movement with respect to the apparatus including feeler means adapted to cooperate with the surface of the workpiece, or workpieces; transducer means connected to the feeler means for providing a signal responsive to said dimensions; processing means connected to said transducer means for processing said signal and providing a measurement signal; and output means connected to the processing means to receive and utilize said measurement signal, wherein the processing means include: a first limiter circuit adapted to receive the signal responsive to the dimensions and limit it as to variations in a pre-established direction; a low pass filter connected to the first limiter circuit for providing at its output said measurement signal; a second limiter circuit including a summing circuit having a first input connected to the output of the low pass filter, a second input adapted for receiving a pre-established reference and an output adapted for providing a sum signal of the two input signals, the output of the summing circuit being connectable to the input of the first limiter circuit; and control means including comparator means and switching means, the comparator means being connected to the transducer means and to the output of said filter, the switching means including a first switch suitable for connecting the summing circuit to the first limiter circuit input and a second switch suitable for inhibiting the first limiter circuit, the comparator means being adapted to provide switching control signals to said switching means according to the values of said signal responsive to the dimensions and to the measurement signal.

7. The apparatus according to claim 6, wherein said comparator means include a first comparator having an input connected to the transducer means and another input connected to the output of said filter, the comparator being adapted to supply a switching control signal to said second switch when the difference between the two input signals of the comparator undertakes a determined polarity.

8. The apparatus according to claim 7, wherein said comparator means include a second comparator having an input connected to the transducer means and another input connected to the output of the summing circuit, the second comparator being adapted to provide a switching control signal to said first switch when the difference between the input signals of the comparator undertakes a determined polarity.

* * * * *